United States Patent
Choe et al.

Patent Number: 5,453,321
Date of Patent: Sep. 26, 1995

[54] HIGH MOLECULAR WEIGHT COPOLYESTERS FOR HIGH MODULUS FIBERS

[75] Inventors: Eui W. Choe, Randolph; John A. Flint, Berkeley Heights, both of N.J.

[73] Assignee: Hoechst Celanese Corp., Somerville, N.J.

[21] Appl. No.: 53,058

[22] Filed: Apr. 26, 1993

Related U.S. Application Data

[63] Continuation-in-part of Ser. No. 955,396, Oct. 1, 1992, abandoned, which is a continuation of Ser. No. 735,553, Jul. 25, 1991, abandoned.

[51] Int. Cl.⁶ .................................................. D02G 3/00
[52] U.S. Cl. .................... 428/364; 528/272; 528/274; 528/298; 528/302; 528/308
[58] Field of Search ...................................... 528/272, 274, 528/298, 302, 308, 308.6; 428/364

[56] References Cited

U.S. PATENT DOCUMENTS 3,008,934  11/1961  Wielicki et al. .......................... 528/298

FOREIGN PATENT DOCUMENTS

52-107319  8/1977  Japan.

*Primary Examiner*—Samuel A. Acquah
*Attorney, Agent, or Firm*—Joseph M. Mazzarese

[57] ABSTRACT

High to ultrahigh polyester compositions comprising monomer units derived from 2,6-naphthalenedicarboxylic acid, 4,4'-bibenzoic acid and ethylene glycol are useful as fibers and molding resins when the mole ratio of 4,4'-bibenzoic acid to 2,6-naphthalenedicarboxylic acid is from about 60:40 to about 40:60, and especially when the two diacids are included in about equimolar amounts. These compositions yield fiber with excellent tensile properties, both at room temperature and at elevated temperatures. When these compositions are melt spun at a relatively low melt temperature and high draw down ratio, fibers with excellent tensile properties are obtained without a subsequent drawing step.

11 Claims, 6 Drawing Sheets

HIGH MOLECULAR WEIGHT COPOLYESTERS FOR HIGH MODULUS FIBERS

CROSS-REFERENCE TO RELATED APPLICATIONS

This patent application is a continuation-in-part of U.S. Ser. No. 07/955,396, filed Oct. 1, 1992, now abandoned which is a continuation of U.S. Ser. No. 07/735,553, filed Jul. 25, 1991, now abandoned.

FIELD OF THE INVENTION

The present invention relates to high modulus polyester fibers. More specifically, the invention relates to a high to ultrahigh molecular weight polyester composition and fibers made from that composition wherein the fibers have excellent tensile properties at room temperature and at elevated temperatures.

BACKGROUND

Poly(ethylene terephthalate) ("PET"), nylons, such as Nylon 6 and Nylon 66, and Rayon are the predominant synthetic polymers used in making tire yarn and tire cord. Each polymer has its own advantages and disadvantages. The most widely used of these, PET, has high tensile strength and tensile modulus, a high glass transition temperature, and good stability. Nylon has excellent strength, toughness and fatigue resistance, but has the serious disadvantage of "flat spotting" in tires because of its low glass transition temperature and a tendency to creep. Rayon retains a higher percentage of its tensile properties at elevated temperatures (e.g., 150° C.). Considerable research has been carried out in an effort to improve the properties of these materials.

One approach has been to try to synthesize a polyester which has a higher tensile strength and tensile modulus than PET and retains these properties at elevated temperatures. Such a material would retain the inherent advantages of polyesters in general, such as chemical stability. Alternative polyesters that have been made and evaluated include poly(ethylene naphthalate) ("PEN"), the condensation polymer of ethylene glycol and 2,6-naphthalenedicarboxylic acid, and the polymer of 4,4'-bibenzoic acid and ethylene glycol.

Copolymers in which 4,4'-bibenzoic acid and/or 2,6-naphthalene dicarboxylic acid are included as comonomers in PET have been reported in European Patent Application No. 202,631. A copolymer of 4,4'-bibenzoic acid, 2,6-naphthalenedicarboxylic acid, and ethylene glycol was reported in Japanese Published Patent Application 50-135333 to be particularly useful for making tire yarn when the mole ratio of 4,4'-bibenzoic acid to 2,6-naphthalenedicarboxylic acid is less than about 1:4. This reference states that when 4,4'-bibenzoic acid makes up more than about 20 mole % of the diacids in the composition, the composition is of no value as a tire yarn because it has a low softening temperature and a low Young's modulus (tensile modulus). This conclusion is supported by examples which indicate that the softening temperature has decreased from 275° C. for PEN to 238° C. in the copolymer in which monomer units derived from 4,4'-bibenzoic acid make up 25% of the monomer units derived from the two diacids (i.e. the ratio of monomer units derived from 4,4'-bibenzoic acid to those derived from 2,6-naphthalenedicarboxylic acid is 1:3).

Japanese Patent Application Kokai No. 52-107319 (laid open Sep. 8, 1977) teaches polyester fibers formed from a polyester derived from acid components comprised mainly of diphenyldicarboxylic acid (A) and naphthalene dicarboxylic acid (B) wherein (A) comprises 20–80 mole % thereof and (B) comprises 80-20 mole % thereof, and glycol components comprised mainly of ethylene glycol. This polyester had an intrinsic viscosity of less than 0.9 dl/g.

U.S. Pat. No. 3,008,934 (Wielicki, et al.) describes a polyester of bibenzoic acid, a dihydric alcohol, and certain aromatic acids. Example 7 teaches fiber made from a polyethylene bibenzoate/2,6-naphthalene-dicarboxylate (50/50 mole %). This polyester des not have a high molecular weight; consequently, the fiber has less than optimal tensile properties.

SUMMARY OF THE INVENTION

The present invention is a high to ultrahigh molecular weight copolyester composition comprising monomer units derived from 4,4'-bibenzoic acid, 2,6-naphthalenedicarboxylic acid and ethylene glycol, but not including monomer units derived from terephthalic acid in a number greater than about 50% of all the diacid components; the ratio of 4,4'-bibenzoic acid to 2,6-naphthalenedicarboxylic acid is from about 40:60 to about 60:40, with the best results being obtained with about equimolar amounts of the two diacid monomers. Preferred compositions have a crystalline melting point less than about 320° C. and an inherent viscosity of at least about 1.0 dl/g when measured at 25° C. and 0.1% concentration on a weight/volume basis in a solution of equal parts by volume of hexafluoroisopropanol and pentafluorophenol.

To make a high molecular weight polymer suitable for melt spinning, an intermediate molecular weight copolyester having an inherent viscosity in the range of about 0.5 dl/g up to about 1.0 dl/g is made by melt polymerization and is then heated in the solid state to a temperature of about 220° C. to about 270° C. for a time sufficient to increase the inherent viscosity of the polymer to at least about 1.0 dl/g. Typically, this heating is done under nitrogen or at reduced pressure for several hours.

The intermediate molecular weight copolyester can be made in two steps by (1) heating a molten mixture of about 40 to about 60 parts on a mole basis of dialkyl 2,6-naphthalenedicarboxylate, about 60 to about 40 parts of dialkyl 4,4'-bibenzoate, and at least about 100 parts of ethylene glycol with an ester interchange catalyst to a temperature of about 200° C. until sufficient by-product alcohol is distilled off to yield a low molecular weight polyester, and (2) heating the low molecular weight polyester in the molten state with a polycondensation catalyst to a temperature of about 240° C. to about 290° C. to yield an intermediate molecular weight polyester having an inherent viscosity in the range of about 0.5 dl/g to about 1.0 dl/g. The preferred dialkyl esters of the two diacids are the dimethyl esters, and the by-product alcohol is then methanol.

The copolyesters of the present invention are melt spun under high stress into high modulus fibers in a single step (i.e., without the need for a post-spinning draw step) by spinning at a high draw down ratio with a relatively low melt temperature. As the melt temperature is increased, a higher draw down ratio is needed to obtain an as-spun fiber with a high modulus. Fibers made by this process have a modulus of at least about 150 grams/denier ("gpd"), preferably at least about 200 gpd, and most preferably at least about 300 gpd.

DETAILED DESCRIPTION OF THE INVENTION

The present invention includes high and ultrahigh molecular weight polyester compositions comprising monomer units derived from 2,6-naphthalenedicarboxylic acid, 4,4'-bibenzoic acid and ethylene glycol in which the ratio of the number of monomer units derived from 4,4'-bibenzoic acid to those derived from 2,6-naphthalenedicarboxylic acid is from about 60:40 to about 40:60. These polymers are useful in making films, shaped articles, as by injection or compression molding, and high modulus fibers. Compositions in which the melting temperature of the polymer is less than about 320° C. are preferred for uses in which melt processing is required.

The polymers of the present invention are particularly useful in making high tenacity and high modulus fibers. Fibers can be readily made by melt spinning. The best results are obtained when the two diacids are present in about equal amounts.

Other monomers may also be included in the compositions useful for melt spinning as long as they don't alter the properties to the extent that fibers can no longer be melt spun or that the fiber properties are no longer useful. Thus, for example, 2,6-naphthalenedicarboxylic acid monomer units, shown as Structure I, are the subject of this invention, but monomer units based on 2,6-naphthalenediol (II), 2-hydroxy-6-naphthoic acid (III) or mixtures thereof may be included in the composition. Similarly, 4,4'-bibenzoic acid monomer units (IV) are essential to the composition disclosed herein, but monomer units derived from 4,4'-biphenol (V), 4-hydroxy-4'-biphenycarboxylic acid (VI) and mixtures thereof may also be included.

Substitution of non-reactive groups for some of the hydrogen atoms on the aromatic rings also is within the scope of the present invention. Suitable substituents include halogen atoms, such as fluorine, chlorine, bromine or iodine; lower alkyl groups having up to about four carbon atoms, such as methyl, ethyl, n-butyl, or tert-butyl; and lower alkoxy groups having up to about four carbon atoms, such as methoxy, ethoxy or butoxy. Minor amounts of linkages other than ester linkages, as for example amide linkages, are also within the scope of the invention. Thus, the amine analogs of the alcohol and phenol monomers may also be included at low levels; examples include ethylenediamine and 4-aminobenzoic acid. Terephthalic acid may also be included as a comonomer as long as monomer units derived from terephthalic acid do not make up more than about 50% of the diacid monomer units.

In addition small amounts of higher glycols, as for example 1,3-propanediol, 1,4-butanediol, and propylene glycol, may be substituted for ethylene glycol. Finally, other bifunctional or multifunctional monomers not specifically named above may be included.

To achieve the high molecular weight necessary for good fiber properties, the number of hydroxyl groups in the starting monomers must be about equal to the number of carboxylic acid groups. Thus, for a composition in which pure 2,6-naphthalenedicarboxylic acid and pure 4,4'-bibenzoic acid are the acid monomers, the amount of ethylene glycol on a mole basis must be about equal to the combined amounts of the two diacids. Substitution of other monomers for the diacids may result in changes in the amount of glycol needed to achieve the stoichiometry needed for making a high molecular weight polyester.

The monomers utilized in this composition are readily made by methods well known in the art. The diacid monomers may also be purchased as the free acids or as the dimethyl esters from commercial suppliers of fine chemicals. Ethylene glycol is commercially available from several manufacturers.

Figure 1:
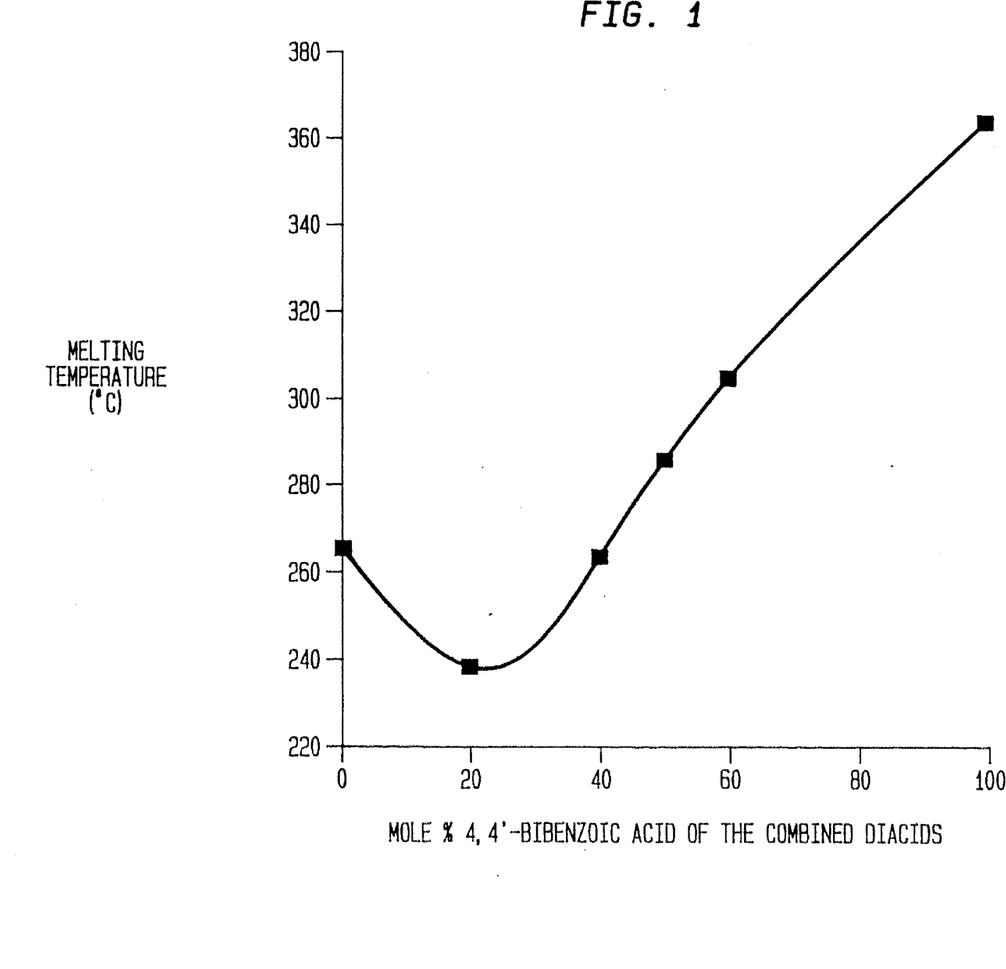
FIG. 1 is a plot of the melting temperature of the copolyesters of the current invention as a function of the composition. The composition is expressed as the mole % of 4,4'-bibenzoic acid of the two diacid monomer units combined.

The crystalline melting points of the copolyesters of 2,6-naphthalenedicarboxylic acid, 4,4'-bibenzoic acid and ethylene glycol vary according to the relative amounts of the two diacids. The melting points of several of these compositions are shown in Table 1 (after Example 6). The melting points are plotted in FIG. 1 as a function of the amount of 4,4'-bibenzoic acid (measured as the mole % of the combined diacids). When the mole % of 4,4'-bibenzoic acid is in the range of about 40% to about 60%, the melting point of the copolyester is in the range of about 260° C. to about 305° C. This is the preferred range for melt spinning of fibers.

At the upper end of the range (about 305° C.), thermal decomposition of the polymer reduces the molecular weight rapidly enough that high tensile properties of fibers are difficult to attain. At the low end of the temperature range, the polyester has lower crystallinity, resulting in poorer fiber tensile properties. The best combination of thermal properties and crystallinity for melt spinning of fibers lies in the middle of this range. The melting point and crystallinity (as measured by $\Delta H_f$ in the DSC data shown in Table 1) appear to go through a minimum when the mole % of 4,4'-bibenzoic acid is within the range of about 20% to about 30%.

The intermediate molecular weight copolyesters disclosed herein can be made by methods commonly used for making polyesters. These methods include interfacial condensation of the glycols with the acid chlorides of the diacids. The polymers can also be made by melt condensation of the glycols with the acids or alkyl esters of the acids. These methods are generally well known in the art.

Figure 6:
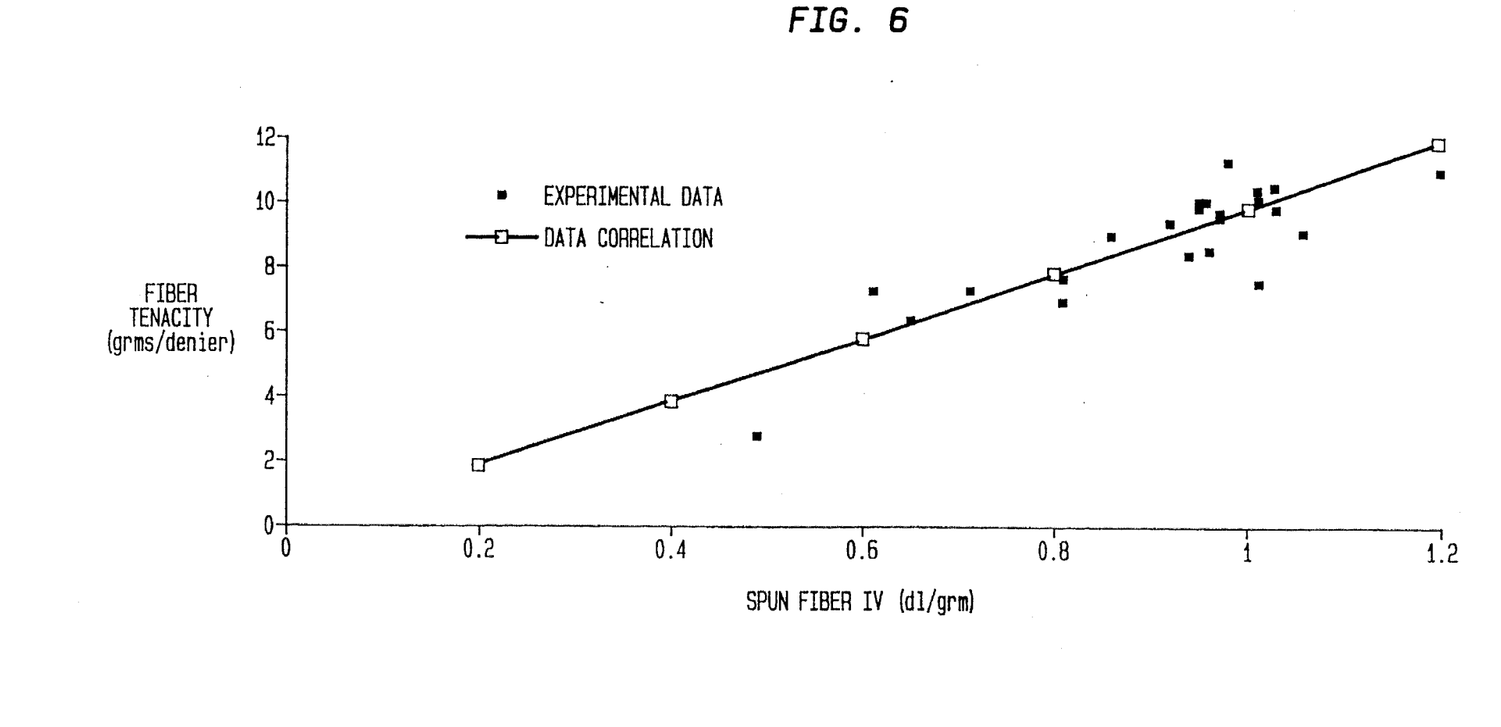
FIG. 6 shows the maximum tenacity that was achieved for fibers made of the composition of the present invention as a function of I.V.

In order to obtain the desired fiber properties, it is necessary to achieve a high to ultrahigh molecular weight, as indicated by a high inherent viscosity ("I.V."). FIG. 6 shows the relationship between I.V. and fiber tenacity for copolymers having a 50:50 acid monomer ratio. The spun fibers preferably have an I.V. of at least about 0.8 dl/g when measured at 25° C. at 0.1% concentration on a weight/volume basis in a solution of equal parts by volume of hexafluoroisopropanol and pentafluorophenol. In general, in order to achieve this I.V. after spinning, it is preferable to melt spin a polymer having an I.V. of at least about 1.0 dl/g before spinning so that thermal decomposition and hydrolysis due to traces of moisture do not reduce the I.V. of the spun fiber to a value of less than about 0.8 dl/g. Melt spinning of polymers having an I.V. of less than about 1.0 dl/g can be carried out successfully, but moisture must be excluded more carefully and the residence time of the polymer at elevated temperature must be reduced.

It has been discovered that a polymer having such a high I.V. can be made by first making an intermediate molecular weight polyester having an I.V. in the range of about 0.5 to about 1.0 dl/g and then raising the molecular weight by solid state polymerization so that the I.V. is at least about 1.0 dl/g, which corresponds to a weight average molecular weight of at least about 55,000–60,000. Polymers having an I.V. of about 1.0 dl/g or more are referred to herein as high molecular weight polyesters; the term ultrahigh molecular weight indicates an I.V. of at least about 2.5 dl/g.

The preferred method of making an intermediate molecular weight polyester for solid state polymerization is to carry out a melt polymerization in two stages. The first stage of the melt polymerization consists of the ester interchange reaction of dialkyl esters of the two diacids with ethylene glycol in the temperature range of about 200° C. to about 240° C. in the presence of an ester interchange catalyst. The ester interchange reaction is carried out under an inert atmosphere (e.g. nitrogen) under anhydrous conditions. Dimethyl esters are the preferred dialkyl esters. The diesters are mixed in the desired ratio with an excess of ethylene glycol in the presence of the ester interchange catalyst. Catalysts which catalyze ester interchange reactions are well known in the art and include Lewis acids and bases, zinc acetate, calcium acetate, titanium tetrabutoxide, germanium tetraethoxide, and manganese acetate. Manganese acetate is preferred. As the ester interchange reaction proceeds, by-product alcohol is removed by distillation. When the preferred dimethyl esters are used, the by-product is methanol. The ester interchange reaction is normally complete in less than about ten hours, preferably two to three hours, and leads to a very low molecular weight material, having an I.V. of less than about 0.2 dl/g.

The second stage of the melt polymerization consists of a polycondensation reaction, wherein a polycondensation catalyst is added and the temperature is raised into the range of about 240° C. to about 290° C. This reaction is preferably carried out at reduced pressure, as ethylene glycol must be removed to achieve the desired intermediate molecular weight. Catalysts for the polycondensation reaction are well known in the art and include Lewis acids and bases, polyphosphoric acid, antimony trioxide, titanium tetraalkoxides, germanium tetraethoxide, organophosphates, organophosphites, and mixtures thereof, with a mixture of triphenylphosphate and antimony trioxide being preferred. The polycondensation reaction is carried out until the I.V. is in the range of about 0.5 dl/g to about 1.0 dl/g and can normally be completed in less than about ten hours, preferably in two to three hours.

The intermediate molecular weight polyester is ground to a powder or is pelletized prior to solid state polymerization. The powder is dried and is then heated in the range of about 220° C. to about 270° C. under an inert atmosphere (e.g., a nitrogen stream) or in a vacuum for a time sufficient to raise the I.V. to at least about 1.0 dl/g. A typical time needed to achieve a high molecular weight is in the range of about 2 hours to about 24 hours. The time needed to achieve high molecular weight can be longer or shorter, depending on the temperature and the molecular weight of the powder. In general, the higher the temperature, the faster the reaction proceeds. However, the temperature cannot be so high that the polymer agglomerates or coalesces, as that would interfere with the progress of the polymerization.

The high I.V. polyester is particularly suitable for melt spinning into high modulus industrial fibers. Melt spinning processes are well known in the art and are widely used in the manufacture of PET fibers.

The polyester of the present invention is dried immediately before spinning, preferably by warming in a dry atmosphere or under vacuum. The dried high molecular weight polyester is then passed into a heated zone, where it is heated to a temperature above the melting point. The molten polymer is then filtered by conventional methods and is extruded through one or more spinnerettes, each having one or more holes. As the polymer is extruded, it is taken up on a reel at a much higher speed than the extrusion speed. The ratio of the take-up speed to the extrusion speed is the draw down ratio. As it is extruded, the fiber is quenched (cooled) in a gas or air stream, so that the point at which drawing of the fiber takes place is localized.

It has been found that the copolyesters of the present invention unexpectedly exhibit melt spinning behavior that is characteristic either of conventional polymers or of thermotropic liquid crystalline polymers, depending on the melt spinning conditions. Conventional fibers, such as PEN or PET, must normally be drawn in a separate post-spinning step in order to attain high tensile properties. Thermotropic liquid crystalline polymers normally can be spun into high modulus fibers without a subsequent drawing step; however, liquid crystalline polymers normally cannot be drawn.

With the copolyesters of the present invention, excellent tensile properties can be achieved in a single spinning step without a subsequent drawing step by maintaining a relatively low melt temperature and a high draw down ratio. When the melt temperature is just above the melting point of the copolyester, excellent tensile properties can be obtained at relatively low draw down ratios. As the melt temperature is increased, a higher draw down ratio is needed to achieve high tensile properties. These data are presented in detail in Examples 9–27 and in Table 2 for the copolyester containing approximately equimolar amounts of 2,6-naphthalenedicarboxylic acid and 4,4'-bibenzoic acid.

Figure 3:
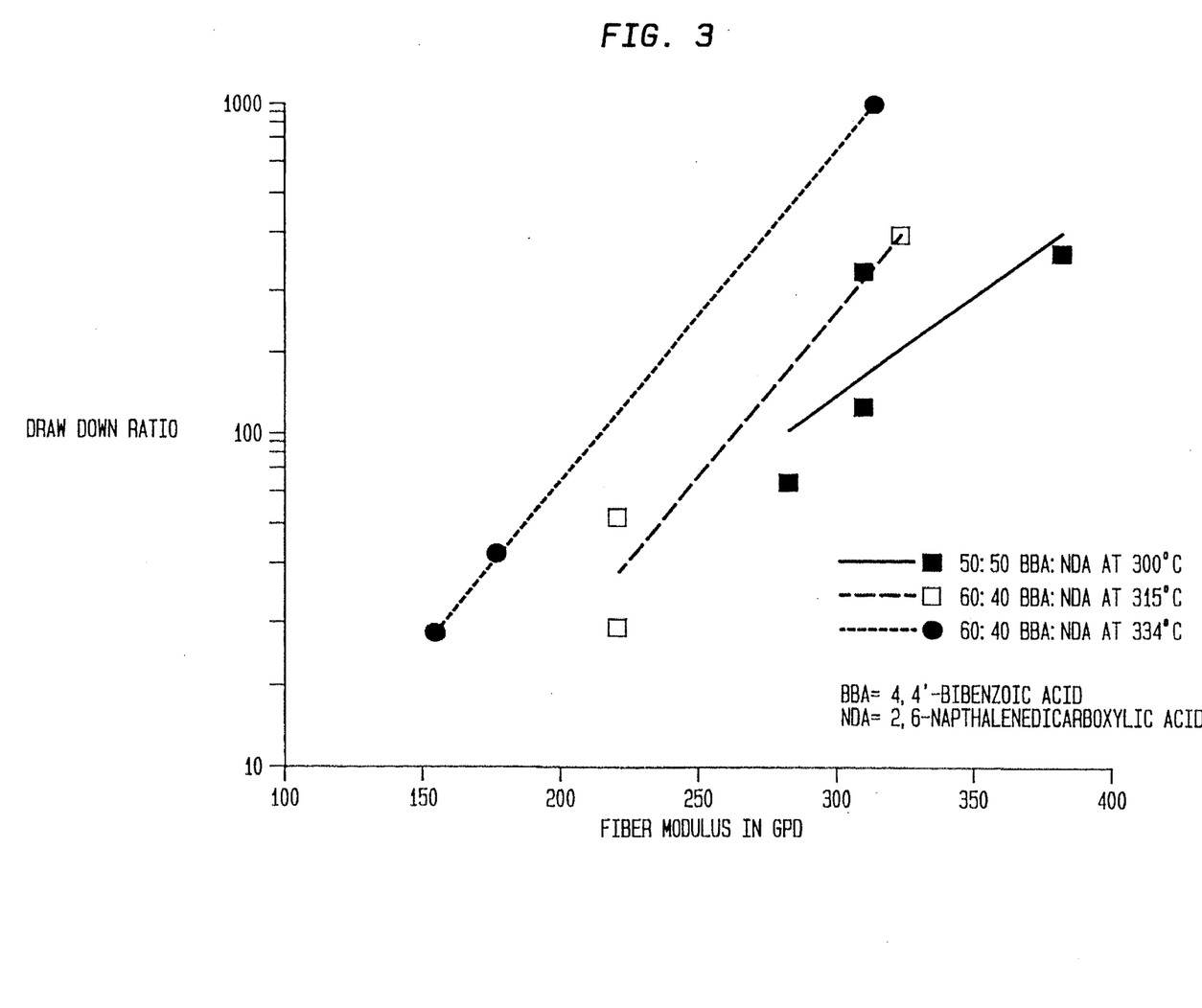
FIG. 3 is a plot of the logarithm of the draw down ratio vs. fiber modulus for the compositions having 4,4'-bibenzoic acid and 2,6-naphthalenedicarboxylic acid in a 50:50 mole ratio and a 60:40 mole ratio.

Analogous results have been achieved for the copolyesters containing different amounts of the two diacids. For example, FIG. 3 shows a plot of the logarithm of the draw down ratio as a function of fiber modulus for the composition containing equimolar amounts of the two diacid components (melting point about 285° C.) at 300° C. and also for the composition containing monomer units derived from 4,4'-bibenzoic acid and 2,6-naphthalenedicarboxylic acid in a 60:40 mole ratio (melting point about 304°) at 315° C. and 334° C. It can be seen that for both compositions, the as-spun modulus increases with draw down ratio. It can also be seen that as the melt temperature increases for the 60:40 composition, a higher draw down ratio is needed to achieve a particular modulus. It is also apparent in FIG. 3 that the composition containing equimolar amounts of the two diacids yields a higher modulus fiber than the 60:40 composition.

The fact that the fiber modulus is high in the as-spun fiber when the melt temperature is kept low and the draw down ratio is kept high may be attributed to stress during spinning. Higher melt viscosity, which results from lower temperatures, and higher draw down ratios both cause increased stress during spinning, and may increase the tendency of the elongated polymer chains to orient themselves in the direction of the fiber. It thus appears that high stress results in increased tensile modulus in the as-spun fiber.

When the copolyesters are melt spun under conditions that result in high tensile properties in the as-spun fiber, the fibers in general can not be drawn appreciably (perhaps a few %). However, if the fibers are spun under conditions of low stress so that the tensile properties are relatively low, then the as-spun fibers behave more like conventional fibers in that they can be drawn at elevated temperatures in a subsequent step to increase the tensile properties. The fiber tensile properties improve on drawing, but they are not as high as those that are achieved under high stress (i.e. low melt temperature and high draw down ratio).

The fact that the fiber can be spun under conditions that lead to high tensile properties in a single spinning step without a subsequent drawing step has great value because it simplifies the process for manufacturing fiber. For comparison, PET is spun in a continuous process, but the process is more complex than that of the present invention because of the necessity of drawing the PET fiber after spinning.

A valuable characteristic of the fibers of the present invention is that they have excellent tensile properties, both at room temperature and at elevated temperatures. For example, fibers made of the 50:50 copolymer of 4,4'-bibenzoic acid and 2,6-naphthalenedicarboxylic acid have a tensile modulus more than twice that of a commercial PET tire yarn (Trevira® Type 800 high denier industrial tire yarn, manufactured by Hoechst Celanese Corporation), both at room temperature (382 gpd vs. 115 gpd) and at 150° C. (154 gpd vs. 57 gpd). The preferred fibers according to the present invention have an initial modulus at 25° C. of at least about 200 gpd, more preferably at least about 300 gpd.

Another valuable property of the fibers of the current invention is that they exhibit reduced hot air shrinkage in comparison with commercial PET tire yarns. Thus, yarn made of the 50:50 copolymer has a hot air shrinkage of about 0.7–0.8%, whereas Trevira® D240 high denier industrial yarn from Hoechst Celanese Corporation has a hot air shrinkage of about 5.4%.

Fibers and yarns made using the copolyesters taught herein can be treated in subsequent steps after spinning much as other polyester fibers (e.g. PET). Thus the fibers or yarns can be treated with one or more finishes, depending on the ultimate end use. The yarns can also be twisted and plied together to make tire cords using conventional techniques.

The copolyesters of the present invention have other end uses besides industrial fibers and yarns. For example, the copolyesters can be extruded as a monofil, a high denier single filament fiber. The copolyesters can also be injection molded into shaped articles with high tensile properties or extruded as tapes. Films, including biaxially oriented films, can also be made from these copolyesters by methods well known in the art. Shaped articles can also be made by compression molding. This is particularly useful for the very high melting compositions.

In order that those skilled in the art can more fully understand this invention, the following non-limiting examples are provided.

EXAMPLE 1

In a 1-liter three-necked resin flask equipped with a nitrogen inlet and outlet, thermometer, condenser and mechanical stirrer were placed 29 grams (0.11888 moles) of dimethyl 2,6-naphthalenedicarboxylate, 32.1 grams (0.11888 moles) of dimethyl 4,4'-bibenzoate, 36.77 grams (0.5930 moles) of ethylene glycol and 0.070 grams of manganese acetate tetrahydrate. The mixture was heated at 220° C. for 2.5 hours while distilling out methanol. Polycondensation catalysts consisting of 0.0675 grams of triphenylphosphate and 0.02259 grams of antimony trioxide were added to the mixture. The resulting mixture was heated with stirring to 270° C. Vacuum was then applied, and the temperature was raised to 283° C. and held at that temperature for 2.5 hours. The resulting polymer was cooled to room temperature to obtain a copolyester with an intermediate molecular weight having an I.V. of 0.85 dl/g as determined at 25 degrees and 0.1% concentration on a weight/volume basis in a solution of equal parts by volume of hexafluoroisopropanol and pentafluorophenol. The polymer had a melting point of 287° C. and a heat of fusion of 44.6 j/g as measured by D.S.C.

The intermediate molecular weight polymer was ground until it could be sifted through a No. 20 mesh screen. The powder was then solid state polymerized at 220 degrees C. for 24 hours under a reduced pressure to attain a polyester with an increased molecular weight having an I.V. of 1.38 dl/g under the conditions described above. The melting point was 288 degrees and the heat of fusion was 62 j/g.

EXAMPLES 2–6

Other polymer compositions made from ethylene glycol, 4,4'-bibenzoic acid, and 2,6-naphthalenedicarboxylic acid were made according to the method of Example 1. The thermal properties of these compositions, including the 50:50 4,4'-bibenzoic acid: 2,6-naphthalenedicarboxylic acid composition of Example 1, are summarized in Table 1. The melting points are plotted in FIG. 1 as a function of the amount of 4,4'-bibenzoic acid, measured as a mole % of the two diacids.

TABLE 1

| Example | Mole %[1] BBA | I.V. (dl/g) | Tmp[2] (°C.) | Tg (°C.) | ΔH$_f$ (j/g) |
| --- | --- | --- | --- | --- | --- |
| 1 | 50 | 1.37 | 285° | None | 62 |
| 2 | 0 | 0.58 | 265° | 99° | 76 |
| 3 | 20 | 1.25 | 238° | 123° | 41 |
| 4 | 40 | 1.14 | 263° | 126° | 44 |
| 5 | 60 | 1.40 | 304° | None | 60 |
| 6 | 100 | | 363° | None | 89 |

[1]Mole % of 4,4'-bibenzoic acid, expressed as the mole % of 4,4'-bibenzoic acid and 2,6-naphthalenedicarboxylic acid combined.
[2]Endotherm peak temperature by DSC.

EXAMPLE 7

A sample of polymer having the composition of Example 1 and having an I.V. of 1.32 was dried under vacuum overnight at 130° C. The polymer was melt spun at a melt temperature of 297° C. and a throughput of 0.128 g/min. through a 0.020" diameter capillary to yield a single filament fiber. The fiber was quenched in air before being taken up at 175 m/min to give 6.6 dpf fiber. This corresponded to a draw down ratio at spinning of 360. Single fiber tensile properties were measured using ASTM test method D 3822. The tests were carried out at 3" gauge length and 60% strain rate. The fiber tensile properties, expressed as tenacity in gpd (T)/% elongation (E)/modulus in gpd (M), were T/E/M=11.6 gpd/ 3.8%/382 gpd. The fiber could not be drawn further over a hot shoe.

EXAMPLE 8

Another sample of polymer having the same composition as that of Example 7 and having an I.V. of 1.15 dl/g was extruded in a similar manner to that described in Example 1 using a melt temperature of 283° C. and an extrusion rate of 0.161 g/min. Fiber of 5.8 dpf was taken up at 250 m/min. This corresponded to a draw down ratio at spinning of 409 and gave filaments with tensile properties of T/E/M=8.4 gpd/4.1%/406 gpd when measured according to the methods set forth in Example 7.

EXAMPLES 9–27

Another sample of polymer having the composition of Example 1 and an I.V. of 1.46 was dried prior to spinning. The polymer was extruded in the same manner as in Example 7, except that the melt temperature during spinning was varied and fiber samples were collected at different take up speeds. The single fiber tensile properties and fiber draw down ratio are shown in Table 2. The tensile properties were measured according to the methods cited in Example 7.

TABLE 2

| Example | Melt Temp (deg C.) | Take up (m/min) | DPF | Tensile Properties T (gpd)/E (%)/ M (gpd) | Draw Down Ratio |
| --- | --- | --- | --- | --- | --- |
| 9 | 317° | 25 | 72 | 2.2/82/87 | 33 |
| 10 | 317° | 50 | 34 | 2.3/47/111 | 70 |
| 11 | 317° | 100 | 20 | 3.3/29/149 | 120 |
| 12 | 317° | 200 | 5.9 | 5.2/8.3/223 | 402 |
| 13 | 317° | 330 | 6.0 | 5.4/5.8/264 | 395 |
| 14 | 308° | 25 | 67 | 1.8/96/67 | 36 |
| 15 | 308° | 50 | 39 | 2.6/19/153 | 59 |
| 16 | 308° | 100 | 14 | 4.0/6.0/201 | 175 |
| 17 | 308° | 200 | 8.6 | 7.1/6.7/269 | 275 |
| 18 | 308° | 330 | 4.8 | 9.5/5.2/338 | 490 |
| 19 | 298° | 25 | 47 | 2.0/15/108 | 52 |
| 20 | 299° | 50 | 27 | 4.4/11/235 | 88 |
| 21 | 299° | 100 | 13 | 5.3/4.5/267 | 180 |
| 22 | 299° | 200 | 5.9 | 8.7/4.9/315 | 400 |
| 23 | 299° | 330 | 3.5 | 10.7/4.8/345 | 680 |
| 24 | 290° | 25 | 46 | 2.9/9.8/178 | 52 |
| 25 | 290° | 50 | 30 | 5.4/5.4/285 | 79 |
| 26 | 289° | 100 | 13 | 9.2/5.6/322 | 190 |
| 27 | 289° | 200 | 7.0 | 10.2/4.5/366 | 340 |

Figure 2:
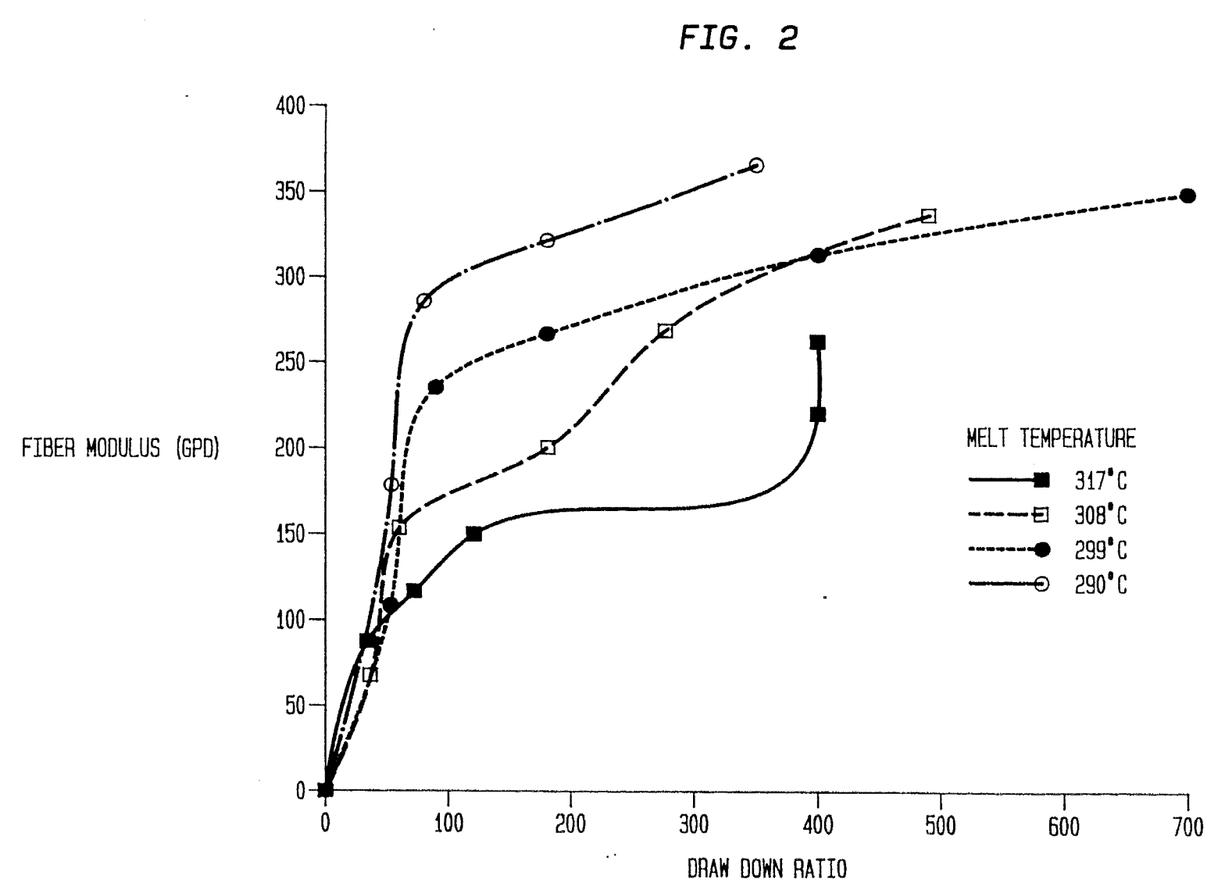
FIG. 2 is a plot of the fiber modulus as a function of the draw down ratio for the composition containing equimolar amounts of the two diacids at several different melt temperatures.

These data show that fiber tensile properties of tenacity and modulus increase both with increasing draw down ratio and with decreasing spinning melt temperature. For example, when the copolyester is spun at a melt temperature of 290° C., which is only about 5° C. higher than the melting point, the spun fiber has a modulus of about 285 gpd at a draw down ratio of about 79 (Example 25). When the melt temperature of the same polymer is about 317° C., the modulus of the spun fiber is about 149 gpd at a draw down ratio of about 120 (Example 11), but at a draw down ratio of about 400, the modulus of the spun fiber is in the range of about 223 to 264 gpd (Examples 12 and 13). It can also be seen in Table 2 that the best tensile properties are obtained at the lowest melt temperatures and the highest draw down ratios. The fiber modulus vs. draw down ratio is plotted in FIG. 2 for this polymer at several different melt temperatures. The general trend is again apparent in FIG. 2 that higher draw down ratios are needed at higher melt temperatures to achieve high tensile properties.

Three samples made at the lowest draw down ratio and the higher spinning temperatures, Examples 9, 14 and 19, could be drawn over a hot shoe at 200° C. to give fiber with increased tensile properties. The other fiber samples could not be drawn appreciably. The improved tensile properties of the drawn fibers are shown in Table 3.

TABLE 3

| | Tensile Properties of Drawn Fibers | |
| --- | --- | --- |
| EXAMPLE | DRAW RATIO | Tensile Properties T (gpd)/E (%)/M (gpd) |
| 9 | 3.1 | 6.0/10.4/228 |
| 14 | 2.1 | 5.0/8.1/198 |
| 19 | 1.4 | 4.7/3.5/240 |

EXAMPLE 28

The tensile properties of three copolyester compositions at elevated temperatures were evaluated by measuring the fiber tensile properties first at room temperature as described in Example 7 and then in a heated atmosphere at 150° C. A sample of a single filament of a commercial polyester tire yarn, Trevira® Type 800 high denier industrial tire yarn, manufactured by Hoechst Celanese Corporation, was run under the same conditions for comparison. The results are shown in Table 4.

Figure 4:
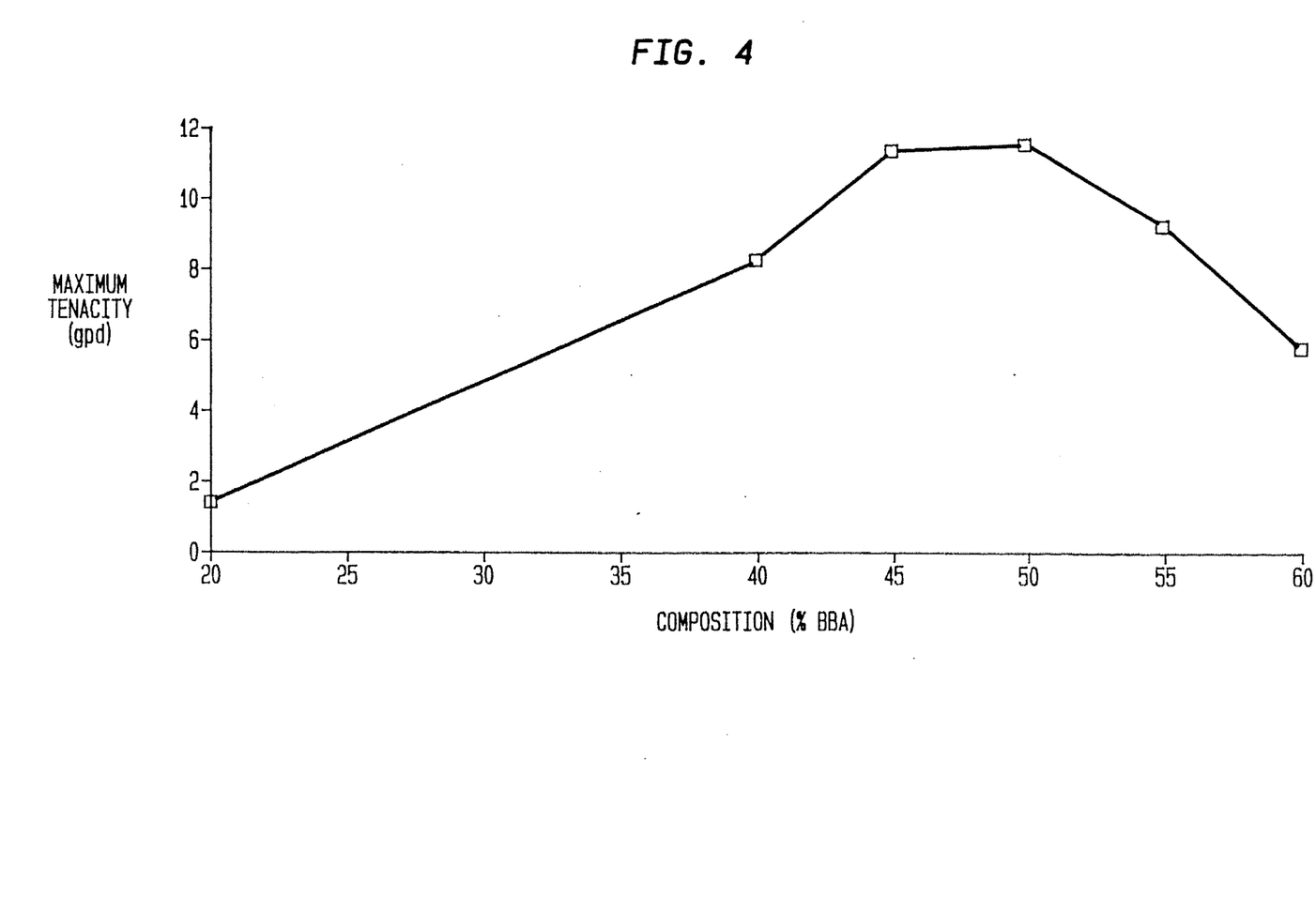
FIG. 4 shows the maximum tenacity or tensile strength that was achieved for fibers of the present invention as a function of polymer composition.

In addition, a sample of fiber grade PET polymer was melt spun into single filament fibers using the same equipment as was used for spinning single filament fiber samples of the polymer of the present invention. The polyester had an I.V. of 0.92 dl/g when measured at 8% concentration in o-chlorophenol at 25° C. The I.V. of the same polymer sample was measured as 1.22 dl/g at 0.1% concentration on a weight/volume basis in a solution of equal volumes of hexafluoroisopropanol and pentafluorophenol at 25° C. After spinning, the single filament PET fiber was drawn over two hot shoes to fully develop the tensile properties. The fiber was then heat set in an oven at 200° C. under nitrogen for 30 minutes in a rack in which the fiber was placed with 2% strain. The tensile properties of this "PET Control" are also shown in Table 4. The stress-strain curves for the PET Control and for the 50:50 copolymer at room temperature and at 150° C. are shown in FIG. 4.

TABLE 4

Tensile Properties of Copolyesters as a Function of Temperature

| | Tensile Properties (T/E/M) | |
|---|---|---|
| | Room Temperatures | 150° C. |
| 40:60 NDA:BBA* | 5.8 gpd/2.5%/324 gpd | 2.4 gpd/1.8%/135 gpd |
| 50:50 NDA:BBA* | 11.6 gpd/3.8%/382 gpd | 5.8 gpd/4.0%/154 gpd |
| 60:40 NDA:BBA* | 3.0 gpd/4.8%/178 gpd | Not Measured |
| Trevira® TYPE 800 | 8.5 gpd/13.7%/115 gpd | 5.4 gpd/15.5%/57 gpd |
| Pet Control | 10.0 gpd/9.4%/170 gpd | 6.0 gpd/9.6%/37 gpd |

*NDA = 2,6-naphthalenedicarboxylic acid
BBA = 4,4'-bibenzoic acid

EXAMPLE 29

A sample of copolyester having the composition of Example 1 and having 1.36 I.V. was dried at 130° C. under vacuum overnight. The polymer was melted in a 1" diameter extruder, and the extrudate was metered using a conventional melt pump to the spinning pack where it was filtered through 70/120 shattered metal. The melt at 289° C. was extruded through a 20 hole annular spinnerette with 0.020" diameter capillaries. Crossflow quench was applied to the emerging filaments to provide a stable spinning environment by localizing the fiber draw point, producing a stable spinning process which yielded fiber with low denier variability along its length. The yarn was dressed with a spin finish before passing around a system of godets. It was finally taken up on a Leesona type winder. The polymer throughput was 7.06 g/min. The 210 denier yarn taken up at 300 m/min (draw down ratio=224) had tensile properties of T/E/M=9.5 gpd/5.2%/295 gpd. That taken up at 400 m/min (draw down ratio=298) had tensile properties of T/E/M=10.6 gpd/4.9%/321 gpd. The spinning melt temperature was carefully selected to be as low as possible, but not so low as to preclude good runnability of the spinning process. It was also found that a 2% hot stretch at 200° C. improved yarn tensile properties from T/E/M=9.3 gpd/5.9%/267 gpd to 10.5 gpd/4.1%/300 gpd. Yarns were tested with a twist at 10" length and at 60% strain rate, using ASTM test method D 885.

EXAMPLE 30

A sample of dried copolyester having approximately equimolar amounts of the two diacids and an I.V. of 1.36 was melted and extruded through a slot die 0.250" long and 0.005" wide at 0.3 g/min. The extrudate was cooled in air and the resulting tape taken up at slow speed. The tensile properties of the tape samples were measured using ASTM test method D 882 and are shown in Table 5. For comparison, the tensile properties of a sample of Vectra® liquid crystalline polymer, manufactured by Hoechst Celanese Corporation, which was extruded into tape in a similar manner, are tenacity, 69 kpsi; elongation, 2.3%; modulus, 3.5 kkpsi.

TABLE 5

| Melt Temp. (°C.) | Take-up m/min | Tape Dimensions | | Draw Down Ratio | Tensile Properties T (kpsi)/ E (%)/M (kkpsi) |
|---|---|---|---|---|---|
| | | Width (inches) | Thickness (mils) | | |
| 297° | 5 | 0.070 | 1.00 | 17.9 | 43.3/2.1/3.0 |
| 290° | 5 | 0.200 | 1.30 | 4.8 | 34.7/3.2/1.7 |
| 291° | 4 | 0.080 | 1.54 | 10.1 | 34.2/2.3/2.3 |
| 287° | 10 | 0.060 | 1.10 | 18.9 | 67.2/3.6/2.9 |

EXAMPLE 31

A copolyester with inherent viscosity of 1.21 dl/g, prepared according to the method of Example 1, was injection molded into ⅛"×⅜"×2½" tensile and flexural bars using a Plasticor Model 64 Injection Molding Apparatus at 310° C. The following mechanical properties were measured using ASTM test methods D 638 and D 790: tensile strength, 6.9 Ksi; modulus, 645 Ksi; elongation to break, 1.28%; flexural strength at break, 13.84 Ksi; flexural strength at 5% strain, 17.97 Ksi; and flexural modulus, 560 Ksi. The modulus of several other commercial materials was measured for comparison: PET molding resin with I.V. 0.76 dl/g, 317 Ksi; CELANEX™ 2002 polybutylene terephthalate, 370 Ksi; and Nylon 66, 172 Ksi. These modulus values were significantly lower than the modulus of 645 Ksi for the copolyester of the present invention.

EXAMPLE 32

Hot air shrinkage measurements were carried out on a yarn sample made according to the method of Example 29 using the composition containing equimolar amounts of the two diacids. Measurements were performed by heating a measured length of yarn with no stress or strain for 30 minutes in an oven at 350° F., cooling the sample to room temperature, and then determining the % change in length. Comparative measurements were also carried out using the same method on a sample of Trevira® D240 high denier industrial yarn from Hoechst Celanese Corporation. The yarn of the current invention exhibited a hot air shrinkage of 0.7–0.8% whereas Trevira® D240 exhibited a hot air shrinkage of 5.4%.

EXAMPLE 33

In accordance with the present invention, high molecular weight copolymers of various compositions and inherent viscosities were made, and fibers were spun therefrom, as indicated in Table 6. For each fiber, Table 6 presents the acid monomer ratio (BBA/NDA), the solid state Polymerization Conditions, the Inherent Viscosity of the unspun polymer, the Spinning Temperature, the fiber denier (DPF), the Draw Down ratio, and the tensile properties of the fiber (Tensile strength/Elongation/Modulus).

TABLE 6

| Acid Ratio | Poly. Cond. | I.V. dl/g | Spin °C. | DPF | Draw Down | T/E/M gpd/%/gpd |
|---|---|---|---|---|---|---|
| 60/40 | 230° C. 16 hrs | 1.13 | 268 | 7.7 | 308 | 8.3/5.3/260 |
| 55/45 | 220° C. 10 hrs | 1.26 | 294 | 14.6 | 162 | 9.7/4.9/291 |
| 55/45 | 240° C. 16 hrs | 1.23 | 286 | 6.8 | 349 | 11.4/4.7/281 |
| 50/50 | 240° C. 16 hrs | 1.17 | 292 | 7.4 | 320 | 10.5/3.9/325 |
| 45/55 | 220° C. 10 hrs | 1.19 | 298 | 7.2 | 329 | 8.4/3.9/258 |
| 45/55 | 240° C. 16 hrs | 1.23 | 303 | 5.4 | 439 | 9.2/3.6/335 |
| 40/60 | 210° C. 24 hrs | 1.40 | 315 | 5.7 | 416 | 5.8/2.5/324 |

Figure 5:
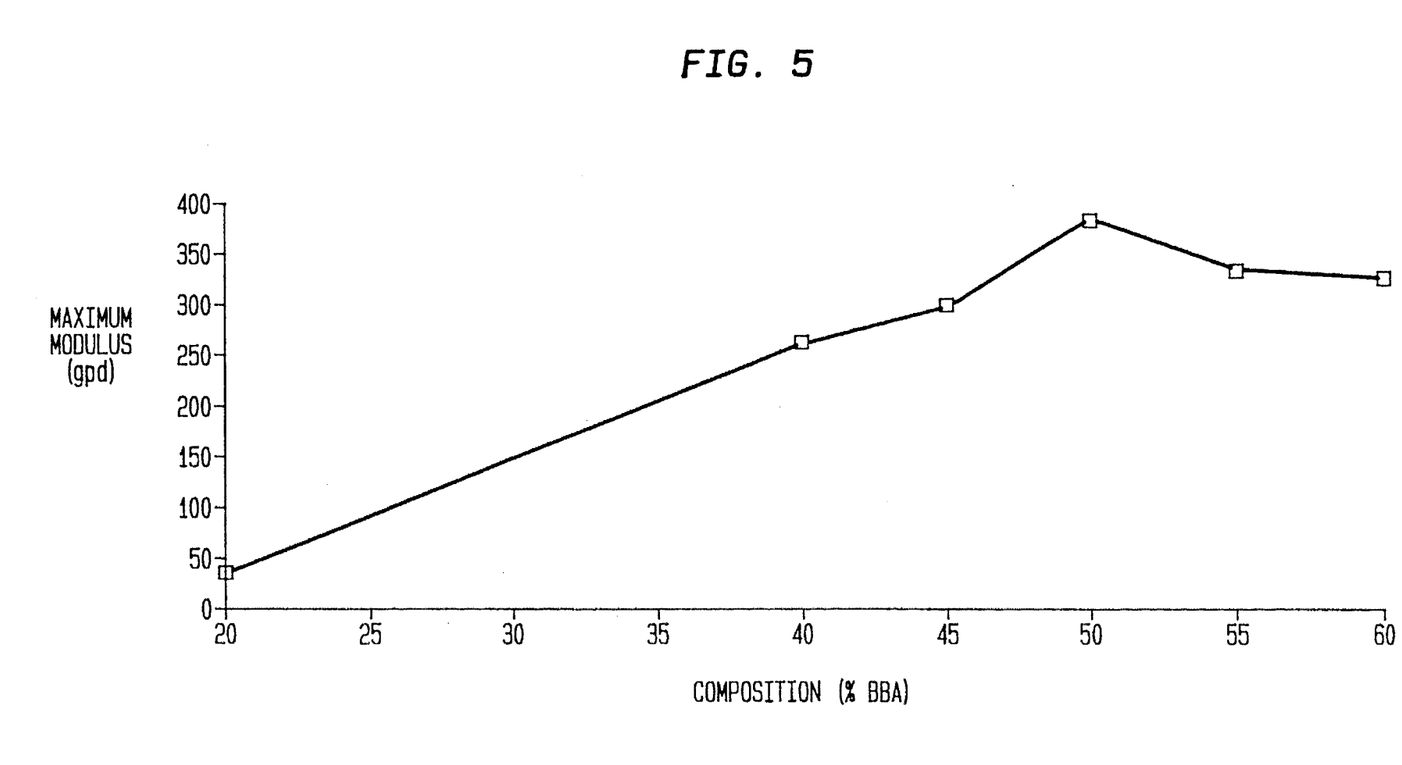
FIG. 5 shows the maximum initial modulus that was achieved for fibers of the present invention as a function of polymer composition.

FIG. 4 plots polymer composition against the maximum tenacity or tensile strength that was achieved for fibers of the present invention. FIG. 5 plots composition against the maximum initial modulus that was achieved for fibers of the present invention. The numbers plotted in each of these figures were taken from the foregoing Examples. It is possible that even higher values are obtainable; these plots merely indicate how fiber properties vary with composition.

EXAMPLE 34

A polymer was made and spun into fiber according to the procedure of Ex. 7 of U.S. Pat. No. 3,008,934. This polymer had an I.V. of 0.87; it would spin only in a narrow temperature range and would not draw down very far without breaking. The fiber properties were relatively poor. Although this patent does not teach solid state polymerization, for test purposes this polymer was then solid state polymerized for 16 hours at 240° C. to an I.V. of 1.05. The spinning characteristics and fiber properties did not improve markedly.

For comparison, a polymer was made by the process of the present invention, except that the catalyst was the same as that used in the procedure of Ex. 7 of U.S. Pat. No. 3,008,934. The polymer had an I.V. of 0.92 before solid state polymerization and 1.68 afterward; fibers were made both from the intermediate I.V. polymer and the high I.V. polymer. In both instances, the spinning and fiber properties were found to be far superior to those of the patented polymer.

Table 7 shows the data for each polymer and fiber of this Example.

TABLE 7

| Acid Ratio | Poly. Cond. | I.V. dl/g | Spin °C. | DPF | Draw Down | T/E/M gpd/%/gpd |
|---|---|---|---|---|---|---|
| 50/50 | — | 0.87 | 276 | 65.8 | 36 | 3.6/16/168 |
| 50/50 | 240° C. 16 hrs | 1.05 | 286 | 60.7 | 39 | 4.2/12/178 |
| 50/50 | — | 0.92 | 286 | 4.2 | 564 | 9.3/3.8/329 |
| 50/50 | 240° C. 16 hrs | 1.68 | 310 | 11.3 | 210 | 9.7/4.0/343 |

These comparative results indicate that the polymers and fibers of the present invention are superior to those of the '934 patent, and that the difference is not due to the different catalyst used. Furthermore, although the patent does not teach using solid state polymerization to achieve an I.V. corresponding to a high molecular weight, this is not the sole important difference between the polymer of the present invention and that of the patent. Clearly, the process of the present invention provides a polymer that is much more suited to being spun and drawn into high modulus fibers.

EXAMPLE 35

The viscosity and molecular weight of a variety of intermediate and high molecular weight polymers according to the present invention having an acid ratio of 50/50 were measured using standard viscometric and chromatographic methods. Table 8 lists the measured inherent viscosity (I.V.), intrinsic viscosity, weight average molecular weight ($M_w$), and number average molecular weight ($M_n$) for each polymer studied.

TABLE 8

| I.V. (dl/g) | Intrinsic Viscosity | $M_w$ | $M_n$ |
|---|---|---|---|
| 0.54 | 0.51 | 26,000 | 18,000 |
| 0.64 | 0.68 | 35,000 | 25,000 |
| 0.71 | 0.74 | 44,000 | 27,000 |
| 1.25 | 1.24 | 72,000 | 44,000 |
| 1.53 | 1.61 | 100,000 | 61,000 |
| 1.74 | 1.77 | 119,000 | 72,000 |

It is to be understood that the above-described embodiments of the invention are illustrative only and that modification throughout may occur to one skilled in the art. Accordingly, this invention is not to be regarded as limited to the embodiments disclosed herein but is to be limited and defined only by the appended claims.

What we claim is:

1. A high molecular weight polyester composition comprising monomer units derived from 2,6-naphthalenedicarboxylic acid, 4,4'-bibenzoic acid and ethylene glycol, but not comprising monomer units derived from terephthalic acid in a number greater than about 50% of all the diacid monomer units; wherein the ratio of the number of monomer units derived from 2,6-naphthalenedicarboxylic acid to the number of monomer units derived from 4,4'-bibenzoic acid is in the range of from about 40:60 to about 60:40 and wherein the inherent viscosity is at least about 1.0 dl/g when measured at 25° C. and 0.1% concentration on a weight/volume basis in a solution of equal parts by volume of hexafluoropropanol and pentafluorophenol.

2. A polyester composition according to claim 1 having a crystalline melting point no greater than about 320° C.

3. A polyester composition according to claim 1 wherein said ratio is about 50:50.

4. A fiber comprising a polyester composition according to claim 3, said fiber having an initial modulus of at least about 300 gpd at 25° C.

5. A fiber according to claim 4 having a tensile strength of at least about 8 grams per denier at 25° C.

6. A fiber comprising a polyester composition according to claim 1, said fiber having an initial modulus of at least about 200 gpd at 25° C.

7. A fiber comprising a polyester composition according to claim 1, said fiber having an initial modulus of at least about 300 gpd at 25° C.

8. A film comprising a polyester composition according to claim 1.

9. A biaxially oriented film comprising a polyester composition according to claim 1.

10. A method for making a polyester composition according to claim 1 comprising the steps of:

synthesizing an intermediate molecular weight polyester having an inherent viscosity of between about 0.5 dl/g and about 1.0 dl/g as measured at 25° C. at 0.1% concentration on a weight/volume basis in a solution of equal parts by volume of hexafluoropropanol and pentafluorophenol; and, heating said polyester in the solid state at a temperature in the approximate range of 220° C. to 270° C. for a time sufficient to increase the inherent viscosity thereof to at least about 1.0 dl/g.

11. A method according to claim 10 wherein said synthesizing step comprises:

heating a molten mixture comprising from about 40 to about 60 parts on a mole basis of 2,6-naphthalenedicarboxylic acid or a methyl or dimethyl ester derivative thereof, from about 60 to about 40 parts of 4,4'-bibenzoic acid or a methyl or dimethyl ester derivative thereof, and at least about 100 parts ethylene glycol in the presence of an ester interchange catalyst to a temperature of from about 200° C. to about 240° C. until a low molecular weight polyester having an inherent viscosity of less than about 0.2 dl/g is formed; and, heating said low molecular weight polyester in the molten state in the presence of a polycondensation catalyst to a temperature of from about 240° C. to about 290° C. to yield said intermediate molecular weight polyester.

* * * * *